J. Frey,
Stump Elevator.
N°37,574.  Patented Feb. 3, 1863.
Fig: 1.
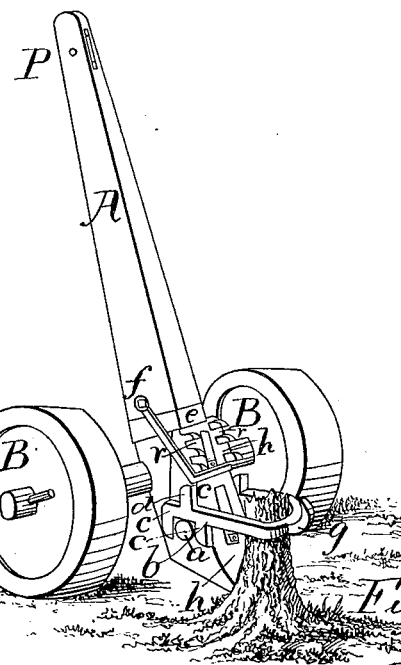
Fig: 2.
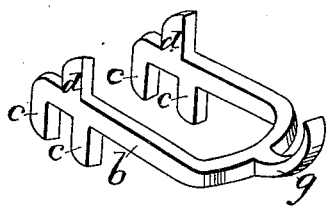
Fig: 3.
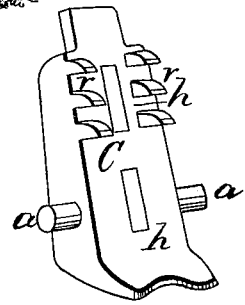
Witnesses;
Asahel Beach
John Meachem
Inventor;
Joseph Frey

UNITED STATES PATENT OFFICE.

JOSEPH FREY, OF BATTLE CREEK, MICHIGAN.

IMPROVEMENT IN GRUBBING-MACHINES.

Specification forming part of Letters Patent No. 37,574, dated February 3, 1863.

*To all whom it may concern:*

Be it known that I, JOSEPH FREY, of the city of Battle Creek, in the county of Calhoun and State of Michigan, have invented a new and useful machine for pulling out trees nine inches and less in diameter, with their roots, and also for pulling out stool or cap grubs; and I do hereby declare that the following is a full, clear, and exact description of the construction and operation of the same, reference being had to the annexed drawings, and making a part of this specification, in which—

Figure 1 is a perspective view of the said machine when in operation, pulling trees, A representing the wooden lever attached to the axle; B B, wooden truck-wheels revolving on the axle; C, the adjustable and movable cast-iron shackle, being a movable attachment of the lever; $a$, lugs on shackle; $b$, reversible wrought-iron clevis and hook; $c\ c\ d$, lugs on clevis; $e$, band around lever and shackle; $f$, anchor-rod for holding shackle by means of the ratchet; $g$, hook to clevis for pulling out stool or cap grubs; $h\ h$, slots in shackle; $r\ r$, ratchet-teeth on shackle; P, pulley in lever.

The machine is operated by a team attached to one end of a rope passing over the pulley and fastened at the other end to a tree, stump, or stake, or by the team operating directly on the lever, the upper part of the tree being first cut away by the ax, leaving a stump about two feet in height, as represented in the annexed drawings.

The operation of pulling out grubs is in this manner. The earth is first removed from around the stool or cap. The end of the cast-iron shackle is then inserted under one side of the stool or cap, and the hook is made to take hold of the opposite side of the stool or cap and the power applied as in pulling trees. The cast-iron shackle is kept in its place when adjusted by the band $e$, and the two iron bolts with heads firmly driven or screwed into the lever and passing through the slots in the shackle, and holding the shackle by means of said bolt-heads, as represented in the accompanying drawings, by the two wood screws, and also by the anchor-rod $f$.

What I mean by a "stool" or "cap" grub is a young tree, the top or body of which above the surface of the ground being frequently killed by fire, the roots whereof continue to grow, and that portion immediately below the surface of the ground by virtue of the law of growth enlarging faster in proportion than the roots, forming a stool or cap, which stool or cap frequently acquires a diameter of one foot or more, and which stool or cap in connection with the roots is familiarly known in this vicinity under the name of a "stool" or "cap" grub.

I call my machine a "tree and grub extractor."

Fig. 2 of the annexed drawings represents the reversible wrought-iron clevis and hook, that part of the clevis which comes in contact with the tree being guttered like a skate-iron, as represented by the accompanying drawings.

Fig. 3 of the annexed drawings represents the adjustable cast-iron shackle.

What I claim as my invention, and desire to secure by Letters Patent, is—

1. The adjustable and movable cast-iron shackle for pulling trees with the roots, in combination with the reversible wrought-iron clevis, or its equivalent, the clevis being guttered.

2. The adjustable and movable cast-iron shackle for pulling stool or cap grubs, in combination with the hook on the reversible wrought-iron clevis.

JOSEPH FREY.

Witnesses:
ASAHEL BEACH,
JOHN MEACHEM.